United States Patent [19]
Scharrenberg et al.

[11] Patent Number: 6,103,348
[45] Date of Patent: Aug. 15, 2000

[54] PLASTICS SHAPED PART WITH A PLURALITY OF FIELDS, AND METHOD AND DEVICE FOR THE MANUFACTURE THEREOF

[75] Inventors: Alfred Scharrenberg, Köngen; Hans H. Schmitz, Wuppertal, both of Germany

[73] Assignee: Otto Deuschle Model- und Formenbau GmbH & Co. KG, Germany

[21] Appl. No.: 09/000,329

[22] PCT Filed: May 23, 1997

[86] PCT No.: PCT/EP97/02653

§ 371 Date: Jan. 29, 1998

§ 102(e) Date: Jan. 29, 1998

[87] PCT Pub. No.: WO97/46363

PCT Pub. Date: Dec. 11, 1997

[30] Foreign Application Priority Data

Jun. 5, 1996 [DE] Germany .......................... 196 22 499

[51] Int. Cl.⁷ ...................................................... B32B 23/02
[52] U.S. Cl. ............................. 428/192; 428/15; 428/33; 428/64.1; 428/66.7; 428/121; 428/124; 428/320.2
[58] Field of Search ........................... 428/15, 192, 64.1, 428/66.7, 33, 320.2, 327, 121, 124; 249/96, 83, 85; 156/79, 245, 212; 264/46.6, 46.4, 46.8, 45.1, 257, 266, 263, 275; 425/117, 149, 169, 175

[56] References Cited

FOREIGN PATENT DOCUMENTS

| | | |
|---|---|---|
| 0018951 | 11/1980 | European Pat. Off. . |
| 0676267 | 10/1995 | European Pat. Off. . |
| 1528176 | 4/1968 | France . |
| 4343240 | 6/1995 | Germany . |
| 4408446 | 9/1995 | Germany . |
| WO 97/46363 | 5/1997 | WIPO . |

OTHER PUBLICATIONS

International Search Report of Jul. 30, 1997.

European Patent Office—Patent Abstracts of Japan, M–0968, vol. 14, No. 209 (concerning Publication No.: 02047021, Publication Date: Feb. 16, 1990, Inventor: F. Norikazu).

European Patent Office—Patent Abstracts of Japan, vol. 95, No. 11 (concerning Publication No.: 07195430, Publication Date: Aug. 1, 1995, Inventor: M. Toshio).

*Primary Examiner*—Deborah Jones
*Assistant Examiner*—Abraham Bahta
*Attorney, Agent, or Firm*—Young & Basile, P.C.

[57] ABSTRACT

A plastic molding with a plastic carrier (62) comprises several regions (50, 52, 54) separated from one another, at least some of these regions (50, 52, 54) being provided with optionally different films (40, 42). In the production of this non-coherent individual moldings separated from one another by separating spaces (46, 58) and corresponding to the regions (50, 52, 54) are first of all produced. Melt of the plastic carrier (62) is then injected into the separating spaces (46, 58), the individual moldings thereby being joined together. The plastic molding thus constitutes a one-piece whole which can be produced in a single production device (1).

14 Claims, 6 Drawing Sheets

PLASTICS SHAPED PART WITH A PLURALITY OF FIELDS, AND METHOD AND DEVICE FOR THE MANUFACTURE THEREOF

FIELD OF THE INVENTION

The present invention relates to a plastic molding that comprises a plastic carrier or support with several regions separated from one another, at least some of these regions being provided, with optionally different films or sheets, as well as a method and a device for its production.

BACKGROUND OF THE INVENTION

A plastic molding is known from DE 44 08 446 A1 that comprises several regions separated from one another and provided with optionally different films. This printed specification also discloses a corresponding method and a corresponding device. The plastic carrier of the molding described in this printed specification is produced in one stage in a uniform working cycle. In the corresponding device a steel punch that can be guided in a vertical direction into the mold recess penetrates the bottom part of the matrix at the boundary between the regions, the edge of the steel punch extending into the mold recess defining the parting line that is to be produced. In a corresponding manner lugs that project into the mold recess are formed on the lower side of the matrix upper part, slightly displaced relative to the position of the steel punch. In this way the edge of the sheets is clamped or fixed, and in addition the prominent parting line between the individual regions of the plastic molding is optically marked.

The disadvantage of this procedure however is that, as regards the flow of the melt of the plastic carrier, there is no clear separation between the regions. High flow rates of the plastics melt may therefore occur, specially in the interstices between the lugs, which may lead to a warpage of the films, especially in the edge region of the parting line. Also there is an often non-uniform distribution of the flow rates of the plastic carrier located in the melt, particularly with large overall structural dimensions, which can likewise lead to a warpage of the films. This is optically disadvantageous, particularly with the nowadays widely employed textile films with line or check patterns.

A further common method for producing plastic moldings with several separated regions is to produce individual moldings and then join these together, for example by bonding or with clips.

The disadvantage of this procedure is that the method is complicated and expensive, and involves several devices and/or extra manual work. Also, the use of adhesives to bond individual moldings is undesirable for ecological and/or health reasons.

SUMMARY OF THE INVENTION

The object of the invention is accordingly to provide a plastic molding of the type mentioned in the introduction that can be produced quickly in one device and without film warpage.

This object is achieved according to the invention if the plastic molding comprises a plurality of individual moldings that in each case correspond to one of the regions and that are first of all separated from one another by separating spaces, and if the individual moldings are then combined together to form a unit by filling the separating spaces with the plastic carrier.

On account of the initial complete separation of the regions and the possibility of maintaining the regions small relative to the overall dimensions of the structural part, warpage of the individual films lying adjacent to the wall of the mold recess is avoided when the plastic carrier melt is injected or forced in. The injection or forcing in of the melt can take place relatively quickly without the visual appearance of the plastic molding, which is a primary quality feature particularly for example in the case of a coating with check pattern films, being adversely affected. In addition the production costs are reduced since a single tool is sufficient to produce the complete molding. Finally, on account of the absence of contacting surfaces that can rub against one another, the one-piece execution reduces the number of possible sources of rattling or squeaking sounds when the plastic molding is in its installed state, for example in vehicles.

An advantageous development of this plastic molding comprises at least one film that has on at least one free edge a folded-down portion around the plastic carrier. In this way the film is prevented from working loose from the plastic carrier in the edge region over the course of time.

Another development of the plastic molding according to the invention comprises a foam cushion that is arranged between at least one film and the plastic carrier. This is advantageous especially in the region of the arm rest of door interior linings or also with panels for mountings and fittings, in order to improve the impact strength and the behaviour in the event of a crash.

On account of the fact that the covering films on the plastic molding according to the invention are largely free from warpage, it is possible to use widely differing materials for the films, for example textile and optionally patterned material, leather, or even thin wood veneers.

The object of the invention is also to provide a method by means of which a plastic molding of the type described at the beginning can be produced quickly, inexpensively and of uniform quality.

The distinguishing feature of this method is that the melt of the plastic carrier is introduced into individual mold recesses that correspond to regions and are separated from one another by separating spaces and the said melt solidifies therein to form individual moldings, and the individual moldings corresponding to the regions and separated from one another are then joined together to form a whole by introducing the melt of the plastic carrier into the separating spaces.

The advantages of the method according to the invention correspond largely to those already described above for the plastic molding according to the invention. An additional advantage of the method however is that, on account of the reduced dimensions of the individual surfaces, the melt can be introduced quickly, thus permitting extremely short cycle times per production cycle.

A development of the method according to the invention has the feature that the melt of the plastic carrier is introduced into at least one region of the mold recess by an injection moulding process, a further increase in the cycle rate thereby being able to be achieved.

The introduction of the plastic carrier melt into at least one region of the mold recess by an injection molding process is advantageous especially where the plastic molding has a complicated edge shape or design, for example a folded-down portion.

In a particularly preferred embodiment of the method according to the invention, the introduction of the plastic carrier melt into the mold recesses of the separating spaces between the regions occurs under a higher pressure than the introduction of the melt into the mold recesses of the regions themselves. The introduction of the melt into the separating spaces in particular is thereby accelerated, which is possible since no warpage of films can occur as a result of an excessively high flow rate.

The object of the present invention is also to provide a device in which all work stages necessary for producing the plastic molding mentioned in the introduction can be carried out in succession.

This object is achieved according to the invention by means of a device comprising: a matrix with a mold recess at least partially reproducing the shape of the plastic molding; means for applying at least one film against the wall of the mold recess; at least one frame guide bar that can be guided into the mold recess and by means of which the edge of the films can be secured along the boundaries of the regions; at least one nozzle through which the plastic carrier melt can be introduced into the mold recess.

The mold recess in the matrix has separating spaces between the regions of the plastic molding to be produced. The frame guide bars that can be guided into the recess are designed so that they can seal the separating spaces against the regions. In each case at least one nozzle is provided per separating space and per region, which is used to introduce the plastic carrier melt into the said separating spaces.

The frame guide bars are of fundamental importance in this context since first of all they seal the separating spaces between the regions and are then retracted in order to open the separating spaces, thereby enabling a one-piece plastic molding according to the invention to be produced in the tool itself.

A preferred modification of the device according to the invention comprises in the region of the separating spaces deflecting nozzles that introduce the plastic carrier melt into the said separating spaces. In this way the dimensions of the separating spaces can be kept particularly small.

A development of the device according to the invention has the feature that a heating device is provided in the region of at least one frame guide bar, which heating device serves to prepare, at the edges of the regions, the plastic carrier introduced into the mold recesses of the regions and possibly already solidified, for the combination with the plastic carrier melt to be subsequently introduced into the separating spaces. This can be effected either by maintaining the edge of the initially introduced plastic carrier at a temperature at which the plastic carrier remains in the melt, or by remelting the already solidified plastic carrier along its edge. The plastic carrier to be introduced into the separating spaces can thus be combined in a particularly rigid and permanent manner with the plastic carrier already introduced into the mold recesses of the regions.

BRIEF DESCRIPTION OF THE DRAWINGS

The invention will now be described in more detail hereinafter with the aid of an embodiment and with reference to the drawings, in which.

DETAILED DESCRIPTION OF THE PREFERRED EMBODIMENT

FIGS. 1 to 5 show an embodiment of a production device at different times during the production of a plastic molding. The production device implements a method according to the combined injection molding and transfer molding principle.

Figure 1:
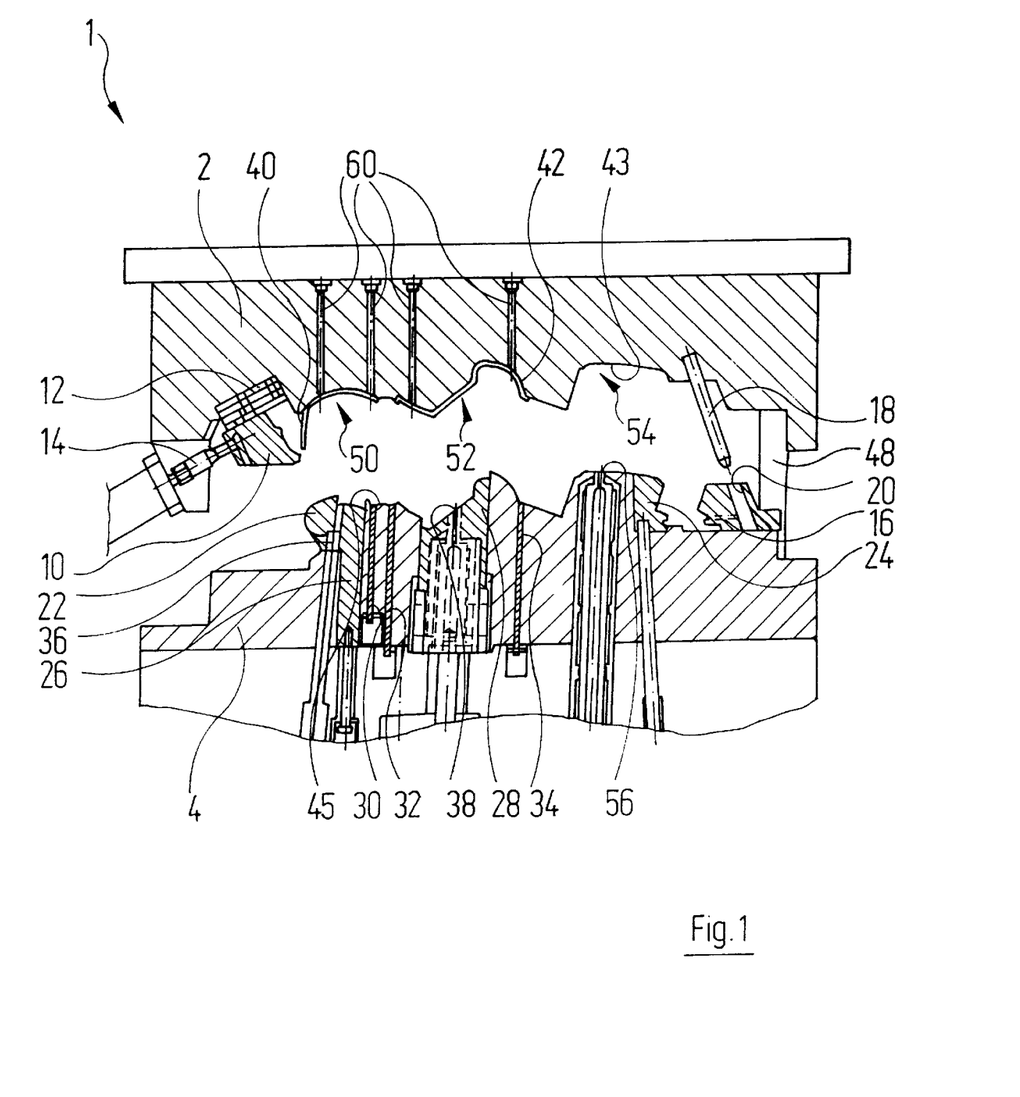
FIG. 1 is a vertical section through a device, in its fully opened state, for producing a plastic molding.

The production device, which is denoted overall by the reference numeral 1, is shown in the opened state in FIG. 1. The production device 1 comprises as principal constituents a matrix upper part 2 and a matrix lower part 4.

The matrix upper part 2 will first be described in more detail:

The underside of the matrix upper part 2 has a mold recess which is subdivided into three regions 50, 52, and 54. In the region 50 a first film 40 is applied against the wall of the mold recess by means of vacuum channels 60. In the region 52 a film 42 is likewise applied against the wall of the mold recess by means of vacuum channels 60. No film is provided in the region 54, and in this case the "bare" film-free surface 43 of the mold recess of the matrix upper part 2 is visible. Similar comments apply to the intermediate space between the regions 50 and 52.

A first external guide bar 10 is shown on the left-hand side of the matrix upper part 2, which guide bar is displaceable in a linear guide 12 and can be actuated by a hydraulic cylinder 14.

The matrix lower part 4 is constructed as follows:

A first internal guide bar is arranged on the left-hand side underneath the film 40, which guide bar copies the internal contour of the outer edge of the region 50 of the plastic molding. The internal guide bar 22 is preferably displaceably mounted with a horizontal movement component in order to release a rear section on the finished plastic molding. A substantially vertically displaceable first punch 26 is arranged adjacent to the first internal guide bar 22. A deflection nozzle 36 for introducing the melt into the region 50 is arranged in the region between the first internal guide bar 22 and the first punch 26. A first frame guide bar 30 is arranged beneath the right-hand edge of the region 50 in the mold lower part 4 and a second frame bar 32 is arranged beneath the left-hand edge of the region 50, both guide bars being vertically displaceable. Part of the free surface 45 of the matrix lower part 4 can be seen between the frame guide bars 30, 32. A second punch 28 is arranged beneath the region 52, and is likewise vertically displaceable. A needle shut-off nozzle 38 is arranged in the second punch 28. A third vertically displaceable frame guide bar 34 is located underneath the right-hand edge of the region 52. The matrix lower part 4 has a further needle shut-off nozzle 56 in the region of the region 54. Finally, a second internal guide bar 24 is also shown, whose external contour matches a horizontally movable second external guide bar 16. An inclined reception bore 20 for a guide pin 18 mounted in an inclined manner in the matrix upper part 2 is provided in the second external guide bar 16. Finally, a guide rod 48 connects the matrix upper part 2 to the matrix lower part 4.

At this point it may be mentioned that the production device 1, like the plastic molding to be produced therein, has a three-dimensional shape. The third dimension, in which in particular further nozzles, guide bars, etc., are arranged, is not shown in FIGS. 1 to 5.

Figure 2:
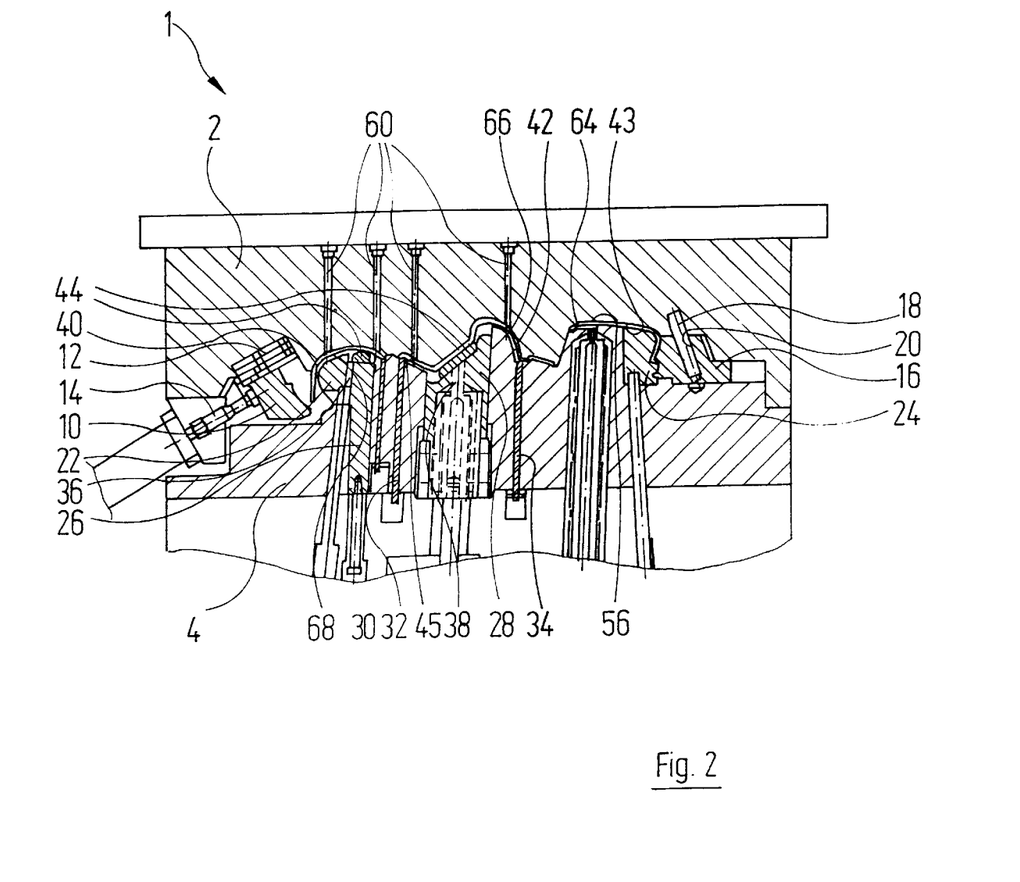
FIG. 2 is a vertical section through the production device of FIG. 1 with lowered matrix upper part before the production of the individual moldings.

FIG. 2 shows the production device 1 at a point in time immediately before the production of the individual moldings, in which the matrix upper part 2 is lowered into its working position. The means employed to lower the matrix upper part 2 are not illustrated. During the lowering of the matrix upper part 2 the inclined guide pin 18 engages in the inclined reception bore 20 of the second external guide bar 16. In this way the external guide bar 16 is moved horizontally to the left to its working position, so that it matches the outside of the right-hand edge of the region 54. Cakes of material 44 can be seen on the upper sides of the punches 26 and 28, which consist of the melt of the plastic carrier 62 and have been introduced from the nozzles 36 and 38. Gaps 64, 66, 68 are visible between the films 40 and 42 and the film-free surface 43 on the one hand, and the guide bars 16, 22 and 24, the punches 26 and 28, and the free surfaces 45 of the matrix lower part 4 on the other hand, into which gaps the melt of the plastic carrier 62 is introduced.

Figure 3:
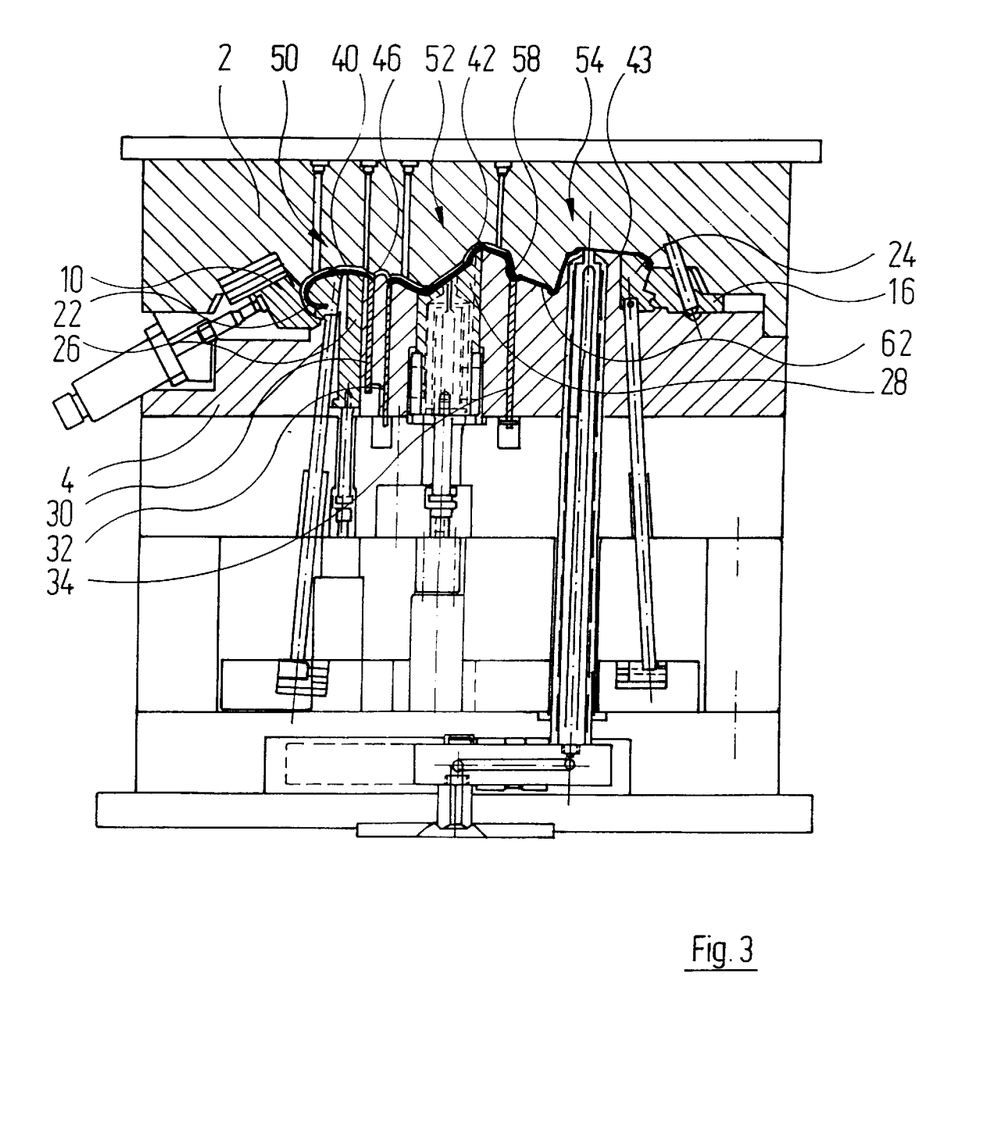
FIG. 3 is a vertical section through the production device of FIG. 1 in the fully closed state after the production of the individual moldings.

FIG. 3 shows the production device 1 at a point in time immediately after the production of the individual moldings. The first external guide bar 10 has been driven so far to the right by the hydraulic cylinder that it matches the left-hand outside part of the region 50. The punches 26 and 28 have similarly moved upwardly, so that the cakes of material 44 have been forced into the hollow spaces 66, 68 (see FIG. 2) between the film 40 and the side guide bar 22 and the first punch 26, and into the hollow space 64 between the film 42 and the second punch 28 and the upper side of the matrix recess 4. Melt has also been injected through the needle shut-off nozzle 56 into the hollow space 64 in the region of the region 54. The separating spaces 46 and 58 between the films 40 and 42 and between the film 42 and the film-free surface 43 are sealed by the upwardly driven frame guide bars 30 and 32 and 58 against a penetration by the melt of the plastic carrier 62.

After the completion of this work stage three individual moldings are thus present, corresponding to the regions 50, 52 and 54.

Figure 4:
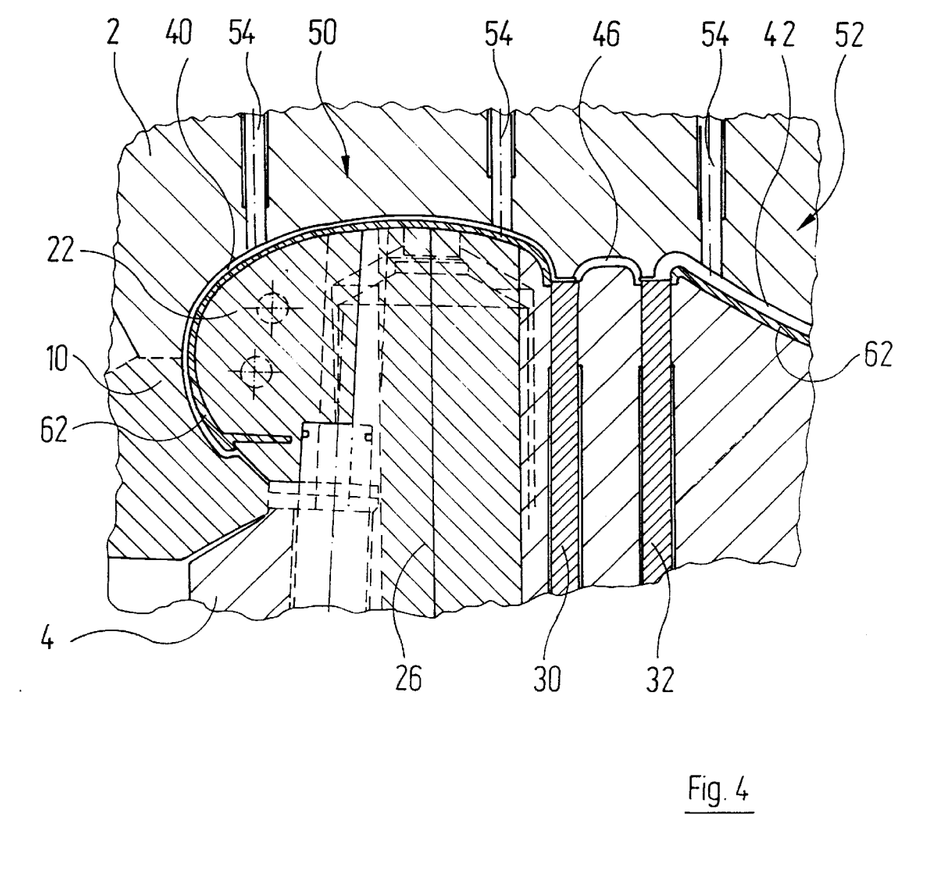
FIG. 4 is a vertical section through a detail of the production device of FIG. 1 after the production of the individual moldings.

FIG. 4 shows a detail from FIG. 3, namely the region of the film 40 and the transition region with the separating space 46 between the film 40 and film 42 on the left-hand side of the production device 1. It can clearly be seen that the fully upwardly driven frame guide bars 30 and 32 press the edges of the films 40 and 42 respectively against the matrix upper part 2 so that they completely seal the separating space 46 against any penetration by the plastic carrier 62. Accordingly no melt of the plastic carrier 62 is forced into the separating space 46 and the individual moldings in the region of the region 50 and in the region of the region 52 are also not connected to one another.

Figure 5:
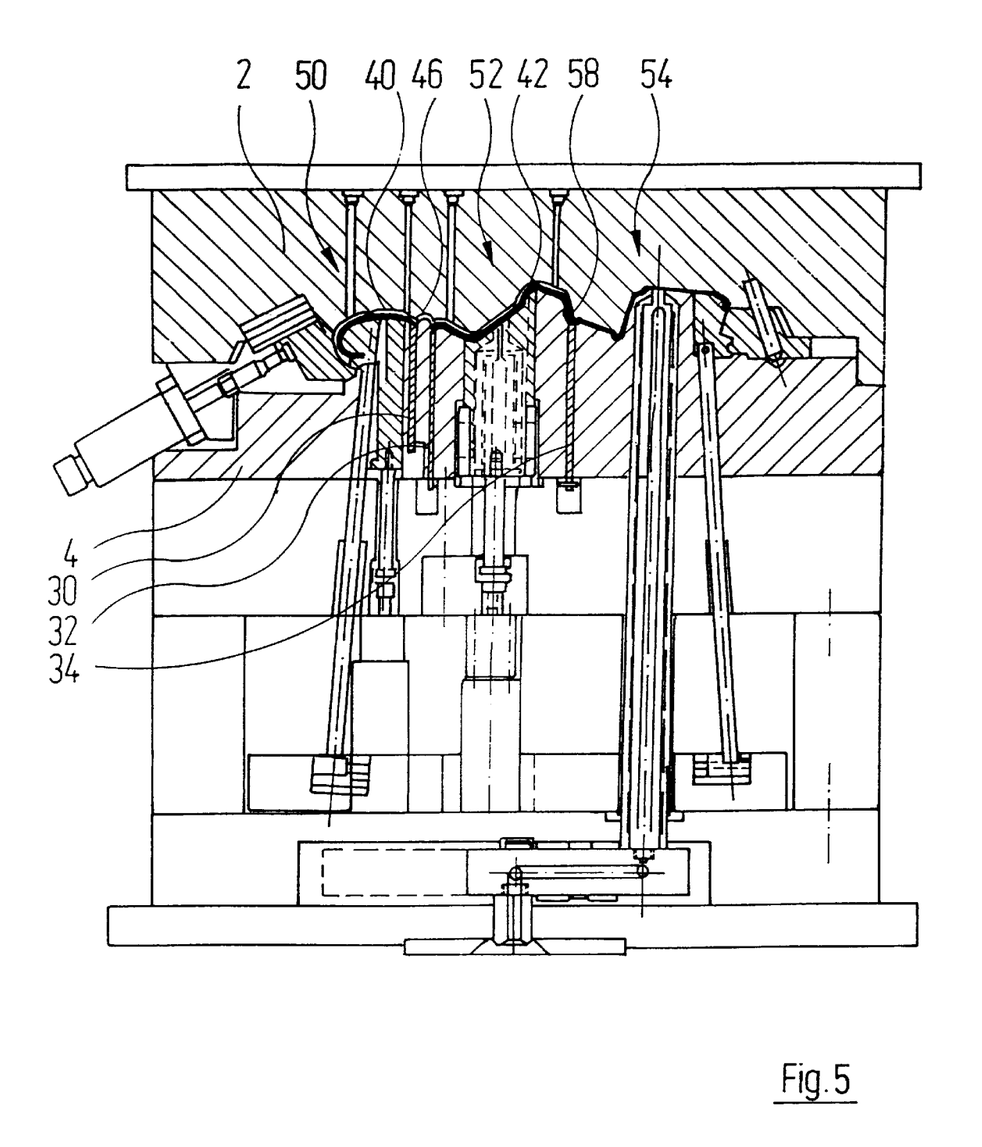
FIG. 5 is a vertical section through the production device of FIG. 1 after the separating spaces have been filled.

FIG. 5 shows the production device 1 after the filling of the separating spaces 46, 58.

In FIG. 5 the frame guide bars 30, 32 and 34 are retracted so far that they release the connections between the separating spaces 46 and 58 and the individual moldings corresponding to the regions 50, 52 and 54. Melt of the plastic carrier 62 has been forced through nozzles (not shown) into the separating spaces 46 and 58. The injection of the melt of the plastic carrier 62 into the separating spaces 46 and 48 may take place under a higher pressure than the preceding injection of the melt into the film-covered mold recesses of the regions 50 and 52. On account of the high temperature of the introduced melt the edge regions of the regions 50, 52 and 54 are melted and a good and stable connection of the individual moldings corresponding to the regions 50, 52 and 54 is thereby achieved. The plastic carrier 62 previously introduced into the mold recesses of the regions 50, 52, 54 may optionally be kept in the molten state or caused to melt at its edges by means of heating devices (not shown), in order to produce a particularly good combination with the melt in the separating spaces 46 and 58. A one-piece is thus formed after the separating spaces 46 and 58 have been filled.

Figure 6:
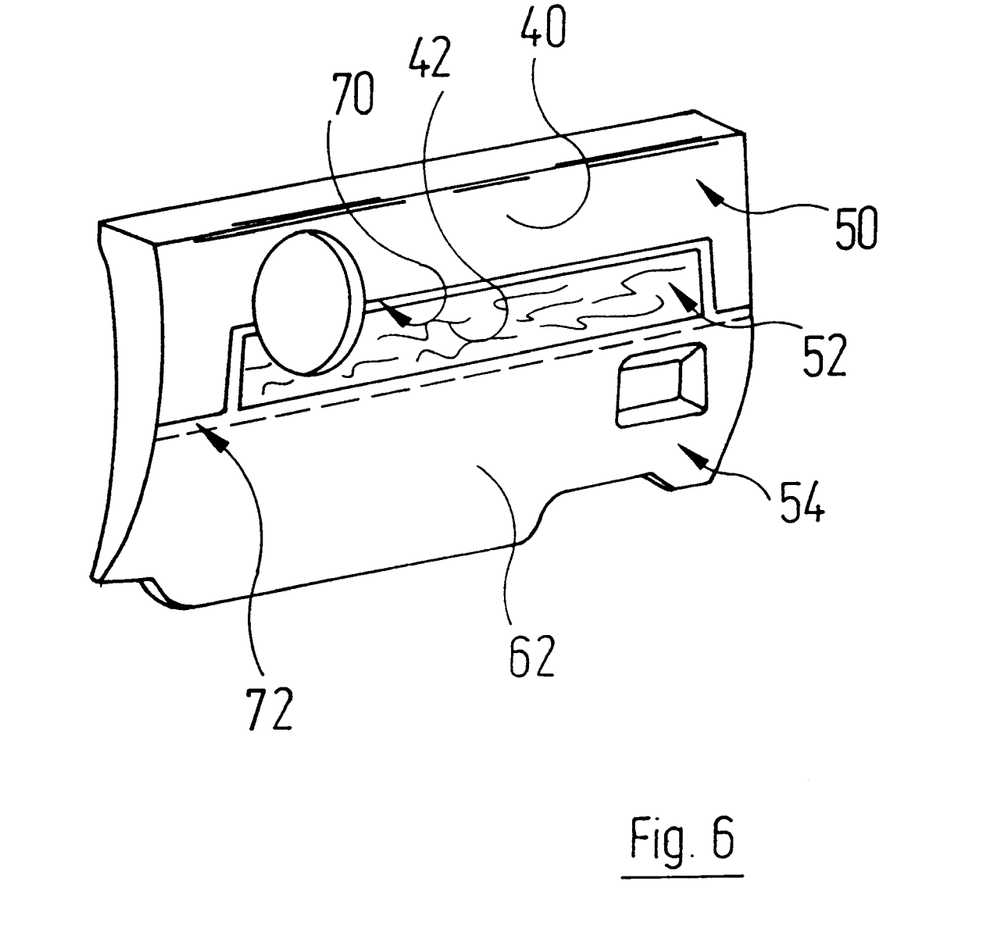
FIG. 6 is a perspective view of a finished plastic molding with several separated regions.

FIG. 6 shows diagrammatically an internal lining part of a vehicle door that can be produced using a device as illustrated in FIGS. 1 to 5. The regions 50 and 52 are covered respectively by the films 40 and 42. The region 54 is not covered with a film, and accordingly the plastic carrier 62 is visible. Between the individual regions 50, 52 and 54 regions 70 and 72 are visible that correspond to the separating spaces 46 and 58 subsequently filled with the melt of the plastic carrier 62.

This plastic molding produced in the production device 1 accordingly first of all consisted of three separate, completely independent individual moldings, and only subsequently forms a one-piece unit when the separating spaces 46 and 58 are filled with the melt of the plastic carrier 62.

What is claimed is:

1. A plastic molding comprising a plastic carrier with several separated regions, at least some of these regions being provided with optionally different films, wherein
   a) the plastic molding comprises several individual moldings each corresponding to one of the regions and which are initially separated from one another by separating spaces;
   b) the individual moldings then are joined to form a unit by filling the separating spaces with the plastic carrier.

2. A plastic molding as claimed in claim 1, comprising at least one film having edges wherein one of the edge portions is folded-down around the plastic carrier.

3. A plastic molding as claimed in claim 1, wherein a foam cushion is arranged between at least one of the films and the plastic carrier.

4. A plastic molding as claimed in claim 1, wherein at least one of the films comprises a textile material.

5. A plastic molding as claimed in claim 1, wherein at least one of the films comprises a leather material.

6. A plastic molding as claimed in claim 1, wherein at least one of the films comprises a material having a textured surface defining a wood grain pattern.

7. A plastic molding as claimed in claim 1, produced according to the method having the steps comprising: bringing the films in a first stage into a shape corresponding to a finished plastic molding, followed by
   a) introducing a melt of the plastic carrier into individual mold recesses separated from one another by separating spaces and corresponding to the regions, and allowing the melt to solidify into the individual moldings therein,
   b) joining the individual moldings separated from one another and corresponding to the regions in a second work stage to form a unitary piece by introducing the melt of the plastic carrier into the separating spaces.

8. A plastic molding as claimed in claim 7, wherein the melt of the plastic carrier is introduced at least into one region of the mold recess by an injection molding process.

9. A plastic molding comprising a plastic carrier with several separated regions, at least some of these regions being provided with optionally different films, wherein a) the plastic molding comprises several individual moldings each corresponding to one of the regions and which are initially separated from one another by separating spaces;

b) the individual moldings then are joined to form a unit by filling the separating spaces with the plastic carrier, wherein said plastic molding is produced according to a method having the steps comprising: bringing the films in a first stage into a shape corresponding to a finished plastic molding following by: introducing a melt of the plastic carrier into individual mold recesses separated from one another by separating spaces and corresponding to the regions, and allowing the melt to solidify into the individual moldings therein, and joining the individual moldings separated from one another and corresponding to the regions in a second work stage to form a unitary piece by introducing the melt of the plastic carrier into the separating spaces, wherein the melt of the plastic carrier is introduced at least into one region of the mold recess by a transfer molding process.

10. A plastic molding comprising a plastic carrier with several separated regions, at least some of these regions being provided with optionally different films, wherein a) the plastic molding comprises several individual moldings each corresponding to one of the regions and which are initially separated from one another by separating spaces;

b) the individual moldings then are joined to form a unit by filling the separating spaces with the plastic carrier, wherein said plastic molding is produced according to a method having the steps comprising: bringing the films in a first stage into a shape corresponding to a finished plastic molding following by: introducing a melt of the plastic carrier into individual mold recesses separated from one another by separating spaces and corresponding to the regions, and allowing the melt to solidify into the individual moldings therein, and joining the individual moldings separated from one another and corresponding to the regions in a second work stage to form a unitary piece by introducing the melt of the plastic carrier into the separating spaces, wherein the introduction of the melt of the plastic carrier into the mold recesses of the separating spaces is effected under a higher pressure than the introduction of the melt of the plastic carrier into the mold recesses corresponding to the regions.

11. A plastic molding comprising a plastic carrier with several regions, at least some of these regions being provided with optionally different films, wherein a) the plastic molding comprises several individual moldings each corresponding to one of the regions and which are initially separated from one another by separating spaces;

b) the individual moldings then are joined to form a unit by filling the separating spaces with the plastic carrier, wherein said plastic molding is produced according to a method having the steps comprising: bringing the films in a first stage into a shape corresponding to a finished plastic molding following by: introducing a melt of the plastic carrier into individual mold recesses separated from one another by separating spaces and corresponding to the regions, and allowing the melt to solidify into the individual moldings therein, and joining the individual moldings separated from one another and corresponding to the regions in a second work stage to form a unitary piece by introducing the melt of the plastic carrier into the separating spaces, wherein the plastic carrier is heated in the region of the edges of the regions before the filling of the separating spaces, in order to improve the combination with the melt of the plastic carrier to be introduced into the separating spaces.

12. A device for producing plastic molding comprising a plastic carrier with several separated regions, at least some of these regions being provided with optionally different films, wherein a) the plastic molding comprises several individual moldings each corresponding to one of the regions and which are initially separated from one another by separating spaces;

b) the individual moldings then are joined to form a unit by filling the separating spaces with the plastic carrier, the device comprising:

a matrix with a mold recess at least partially matching the shape of the plastic molding; means to apply at least one film against the wall of the mold recess; at least one frame guide bar driven into the mold recess, by means of the guide bar the edge of the film is secured along the boundaries of the regions; at least one nozzle through which the melt of the plastic carrier can be introduced into the mold recess; wherein a) the mold recess in the matrix between the regions of the plastic molding to be produced has separating spaces;

b) the frame guide bars are designed so that they can seal the separating spaces against the regions;

c) at least one nozzle is provided per region, said nozzle introduces the melt of the plastic carrier into the mold recess of the regions;

d) at least one nozzle is provided per separating space, said nozzle introduces the melt of the plastic carrier into the separating spaces.

13. A device as claimed in claim 12, comprising deflection nozzles in the regions of the separating spaces, wherein the nozzles introduce the melt of the plastic carrier into the separating spaces.

14. A device as claimed in claim 12, wherein a heating device is provided in the region of at least one frame of the guide bars, wherein the heating device prepares the plastic carrier introduced in the region of the regions and which is already solidified, at the edges of the regions for the introduction of the melt of the plastic carrier to be subsequently introduced into the separating spaces.

* * * * *